(12) United States Patent
Welton et al.

(10) Patent No.: US 7,216,710 B2
(45) Date of Patent: May 15, 2007

(54) THIOL/ALDEHYDE CORROSION INHIBITORS

(75) Inventors: Thomas D. Welton, Duncan, OK (US); Juanita M. Cassidy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 604 days.

(21) Appl. No.: 10/771,612

(22) Filed: Feb. 4, 2004

(65) Prior Publication Data

US 2005/0169794 A1   Aug. 4, 2005

(51) Int. Cl.
*E21B 43/27*   (2006.01)
*E21B 41/02*   (2006.01)

(52) U.S. Cl. .................... 166/307; 166/902; 422/12; 507/258; 507/268; 507/934; 507/939

(58) Field of Classification Search ............... 166/259, 166/271, 307, 902; 422/12; 507/258, 268, 507/277, 934, 939
See application file for complete search history.

(56) References Cited

U.S. PATENT DOCUMENTS

| | | | |
|---|---|---|---|
| 2,605,223 A | 7/1952 | Case | |
| 3,094,490 A | 6/1963 | Gardner et al. ............. 252/149 |
| 3,585,069 A | 6/1971 | Owsley ....................... 117/127 |
| 3,589,860 A | 6/1971 | Foroulis ....................... 21/2.7 |
| 3,669,613 A * | 6/1972 | Knox et al. .................... 422/12 |
| 4,539,122 A | 9/1985 | Son et al. | |
| 4,732,259 A | 3/1988 | Yu et al. ...................... 198/365 |
| 4,734,259 A | 3/1988 | Frenier et al. ................ 422/16 |
| 4,978,512 A * | 12/1990 | Dillon ........................ 423/226 |
| 5,441,929 A * | 8/1995 | Walker ........................ 507/260 |
| 5,976,416 A | 11/1999 | Brezinski ............... 252/389.62 |
| 6,056,896 A | 5/2000 | Brezinski ..................... 252/394 |
| 6,117,364 A | 9/2000 | Vorderbruggen et al. ... 252/395 |
| 6,365,067 B1 | 4/2002 | Ahn et al. ............. 252/389.23 |
| 2005/0250666 A1* | 11/2005 | Gatlin et al. ................. 510/424 |

FOREIGN PATENT DOCUMENTS

EP   0878605 A2   11/1998

OTHER PUBLICATIONS

Foreign Communication From a Related Counterpart Application, Mailing Date Apr. 11, 2005, PCT/GB2004/005382, filed Dec. 22, 2004.

* cited by examiner

*Primary Examiner*—George Suchfield
(74) *Attorney, Agent, or Firm*—Robert A. Kent; Baker Botts

(57) ABSTRACT

Methods of inhibiting corrosion comprising providing a corrosive environment; adding a corrosion inhibitor comprising a reaction product of a thiol compound and an aldehyde compound. Methods of acidizing a near well bore region of a subterranean formation comprising isolating a zone of interest along a well bore; and placing an acidizing solution in the zone of interest wherein the acidizing solution comprises an acid and a corrosion inhibiting compound comprising the reaction product of a thiol compound and an aldehyde compound.

20 Claims, No Drawings

THIOL/ALDEHYDE CORROSION INHIBITORS

BACKGROUND OF THE INVENTION

The present invention relates generally to corrosion inhibitors, and more particularly to corrosion inhibitors comprising reaction products of a thiol compound and an aldehyde compound and methods of using such inhibitors.

Metals such as carbon steel alloys, copper and its alloys, chrome alloys, and nickel alloys are commonly used in subterranean application equipment (such as in drilling pipes and mixing tanks) and installations (such as gravel pack screens, tubing, and casings). Oftentimes, these metals are subjected to corrosive fluids during subterranean operations.

One such corrosive fluid is an acidizing fluid. Subterranean hydrocarbon-containing formations penetrated by well bores are commonly treated with aqueous acid solutions to stimulate the production of hydrocarbons therefrom. One such treatment known as "acidizing" involves the introduction of an aqueous acid solution into the subterranean formation under pressure so that the acid solution flows through the pore spaces of the formation. The acid solution reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces in the formation. Some commonly used acids include hydrochloric acid, hydrofluoric acid, acetic acid, formic acid, citric acid, ethylene diamine tetra acetic acid ("EDTA"), and combinations thereof.

In carrying out acidizing and fracture-acidizing treatments in wells and other similar treatments using aqueous acid solutions, the corrosion of metal tubular goods, pumps, and other equipment is often a problem. The expense associated with repairing or replacing corrosion damaged metal tubular goods and equipment can be very high. In a well treatment utilizing an aqueous acid solution, the corrosion of metal surfaces in tubular goods and equipment results in at least the partial neutralization of the aqueous acid solution before it reacts with acid-soluble materials in the subterranean formation to be treated. Also, the presence of dissolved metals in the aqueous acid solution can bring about the precipitation of insoluble sludge when the aqueous acid solution contacts crude oil which can in turn severely damage the permeability of the subterranean formation being treated.

Another commonly used corrosive fluid is heavy brine. Heavy brines are often used in the drilling of a well bore into a subterranean formation. It is necessary to cool the drill bit as it cuts into the formation and to remove the drill cuttings from the well bore. Normally, a drilling fluid is circulated downwardly through the drill pipe within the well bore and outwardly through nozzles or openings in the drill bit. The drilling fluid then passes upwardly through the well bore annulus to the surface. Commonly employed drilling fluids are high-density aqueous brine solutions. For example, calcium chloride solutions can be produced having a density up to about 11.7 pounds per gallon of solution. Calcium bromide can be used to produce aqueous brines having a density of up to about 14.2 pounds per gallon. The incorporation of solid calcium chloride pellets in the brine permits a fluid having a density of about 15 pounds per gallon to be formed. When heavy brine solutions having a density greater than 15 pounds per gallon are required, aqueous solutions of zinc halides, such as zinc chloride or zinc bromide, normally are employed, either individually or as blends with calcium halides. Most of the heavy brine solutions are highly corrosive to metals and, therefore, require the addition of expensive inhibitors to the solutions to protect metal surfaces contacted by the fluids.

Many corrosion inhibitors are useful only at selected temperature levels or pH ranges for the various heavy brines and dilution, temperature changes or any change which affects the pH of the brine often results in loss of the corrosion inhibition. Particular problems arise in the selection of corrosion inhibitors for use in zinc halide-containing heavy brine solutions. Many common corrosion inhibitors, such as organic thiophosphates, quaternized amines, polyphosphate esters, filming amines, and the like form precipitates or are ineffective when admixed with zinc halide-containing heavy brine solutions.

A variety of metal corrosion inhibiting formulations for use in aqueous acid solutions have been developed and used successfully heretofore. Many of such corrosion inhibiting formulations have included quaternary ammonium compounds as essential components, particularly in high temperature applications. However, problems have been associated with the use of quaternary ammonium compounds in that they are generally highly toxic to aquatic organisms. Further, the quaternary ammonium compounds that achieve high degrees of metal corrosion protection at high temperatures are those that have relatively high molecular weights and high degrees of aromaticity. Those quaternary ammonium compounds are not readily available commercially and are very expensive to produce.

SUMMARY OF THE INVENTION

The present invention relates generally to corrosion inhibitors, and more particularly to corrosion inhibitors comprising reaction products of a thiol compound and an aldehyde compound and methods of using such inhibitors.

A method of inhibiting corrosion comprising the step of providing a corrosive environment; and adding a corrosion inhibitor comprising a reaction product of a thiol compound and an aldehyde compound.

A method of acidizing a near well bore region of a subterranean formation comprising the steps of isolating a zone of interest along a well bore; and placing an acidizing solution the zone of interest wherein the acidizing solution comprises an acid and a corrosion inhibiting compound comprising the reaction product of a thiol compound and an aldehyde compound.

The features and advantages of the present invention will be readily apparent to those skilled in the art upon a reading of the description of the preferred embodiments that follows.

DESCRIPTION OF PREFERRED EMBODIMENTS

The present invention relates generally to corrosion inhibitors, and more particularly to corrosion inhibitors comprising reaction products of a thiol compound and an aldehyde compound and methods of using such inhibitors. The corrosion inhibitors of the present invention may be used to protect metals against acids, heavy brines, and other treatment fluids commonly used in subterranean applications.

The corrosion inhibitors of the present invention comprise the reaction products of a thiol compound and an aldehyde compound; these compounds may be generally described as thioacetals. One skilled in the art will be aware of numerous methods in the prior art for making a thioacetal compound. Thiols can be reacted with aldehydes in any ratio to make the desired thioacetal, mixed thioacetal, hemithioacetal, oxathiolane, or mixture thereof. Thioacetals suitable for use as the corrosion inhibitors of the present invention include monothioacetals having the general formula:

$R_2C(OR')(SR'')$, wherein R, R' and R'' may be H and dithioacetals having the general formula:

$R_2C(SR')(SR'')$, wherein R, R' and R'' may be H.

Aldehyde compounds suitable for use in the present invention include cinnamaldehyde and its derivatives. Suitable aldehydes include α,β-unsaturated aldehydes having the general the formula:

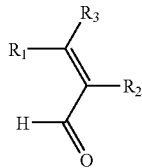

wherein:
$R_1$ represents:
   a saturated or unsaturated aliphatic hydrocarbon group containing from about 3 to about 12 carbon atoms;
   a substituted saturated or unsaturated aliphatic hydrocarbon group containing from about 3 to about 12 carbon atoms and containing one or more non-interfering substituents;
   an aryl group, e.g., phenyl, benzyl or the like;
   a substituted aryl group containing one or more non-interfering substituents; or,
   a non-interfering substituent per se.
$R_2$ represents:
   hydrogen;
   a saturated or unsaturated aliphatic hydrocarbon group containing from 1 to about 5 carbon atoms;
   a substituted saturated aliphatic hydrocarbon group containing from 1 to about 5 carbon atoms and containing one or more noninterfering substituents;
   an aryl group;
   a substituted aryl group containing one or more non-interfering substituents; or,
   a non-interfering substituent per se.
$R_3$ represents:
   hydrogen;
   a saturated or unsaturated aliphatic hydrocarbon group containing from about 3 to about 12 carbon atoms;
   a substituted saturated or unsaturated aliphatic hydrocarbon group containing from about 3 to about 12 carbon atoms and containing one or more non-interfering substituents;
   an aryl group;
   a substituted aryl group containing one or more non-interfering substituents; or,
   a non-interfering substituent per se.

The total number of carbon atoms in substituents represented by $R_1$, $R_2$ and $R_3$ range from 1 to about 16, preferably from 5 to 10. The "non-interfering substituents" referred to above are those substituents that have no adverse effect on the corrosion inhibition. They include, for example, lower alkyl (containing from 1 to about 4 carbon atoms), lower alkoxy (containing from 1 to about 4 carbon atoms), halo, i.e., fluoro, chloro, bromo or iodo, hydroxyl, dialkylamino, cyano, thiocyano, N,N-dialkylcarbamoylthio and nitro substituents.

Examples of aldehydes suitable for use in the present invention include, but are not limited to: 7-phenyl-2,4,6-heptatrienal, crotonaldehyde, 2-hexenal, 2-heptenal, 2-octenal, 2-nonenal, 2-decenal, 2-undecenal, 2-dodecenal, 2,4-hexadienal, 2,4-heptadienal, 2,4-octadienal, 2,4-nonadienal, 2,4-decadienal, 2,4-undecadienal, 2,4-dodecadienal, 2,6-dodecadienal, citral, 1-formyl-[2-(2-methylvinyl)]-2-n-octylethylene, cinnamaldehyde, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, 5-phenyl-2,4-pentadienal, 5-(p-methoxyphenyl)-2,4-pentadienal, 2,3-diphenylacrolein, 3,3-diphenylacrolein, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, 2-(p-methylbenzylidine)decanal, α-bromo-p-cyanocinnamaldehyde, α-ethyl-p-methylcinnamaldehyde, p-methyl-α-pentylcinnamaldehyde, 3,4-dimethoxy-α-methylcinnamaldehyde, α-[(4-methylphenyl)methylene]benzeneacetaldehyde, α-(hydroxymethylene)-4-methylbenzylacetaldehyde, 4-chloro-α-(hydroxymethylene)benzeneacetaldehyde, α-nonylidenebenzeneacetaldehyde, mixtures thereof, and the like.

Thiol compounds suitable for use in the present invention include thiols and their derivatives. Thiols are compounds having the general formula:

RSH, wherein R may be H examples of suitable thiols suitable for use in the present invention include, but are not limited to, thiosorbitol, hydrogen sulfide, methanethiol, thioethanol, 1-thio-2-butanol, 1,2-ethanedithiol, 1,3-propanedithiol, 2-aminoethanethiol, 2-mercaptobenzothiazole, 2-mercaptothiazoline, glycol dimercaptoacetate, mercaptosuccinic acid, thioglycerol, thiolactic acid, cysteine, 6-amino-3-mercaptothiazole, 6-ethoxy-2-mercaptobenzothiazole, glycerol monothioglycolate, monoethanolamine thioglycolate, methyl thioglycolate, isooctyl thioglycolate, ethyl thioglycolate, 2-ethyl hexyl thioglycolate, and thioglycolic acid.

Some embodiments of the present invention comprise combining the reaction product thioacetals with a traditional corrosion inhibitor such as cinnamaldehyde, acetylenic alcohols, fluorinated surfactants, quaternary derivatives of heterocyclic nitrogen bases, aromatic compounds, formamides, combinations of such compounds used in conjunction with iodine; quaternary ammonium compounds; and combinations thereof. The quaternary ammonium compounds which function as corrosion inhibitors and can be used in accordance with the present invention have the general formula:

$(R)_4N^+X^-$ wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms. Examples of quaternary ammonium compounds which can be included in the corrosion inhibiting composition of this invention are N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride, and the like. The traditional corrosion inhibitor used may be included in corrosion inhibiting mixture in an amount in the range of from 0.5% to about 80% by weight of total corrosion inhibiting mixture, preferably from about 1% to about 45% by weight of total corrosion inhibiting mixture.

Along with such traditional corrosion inhibitors, embodiments of the present invention may further comprise components commonly used in corrosion inhibiting formulations such as acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons.

Corrosion inhibitor activators function to activate corrosion inhibitor components such as quaternary ammonium compounds so that they function as corrosion inhibitors. Examples of such corrosion inhibitor activators which can be used in accordance with the present invention are cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. When a corrosion inhibitor activator is included in a composition of this invention, it is generally present in an amount in the range of from about 0.1% to about 10.0% by weight of the composition.

Other embodiments of the present invention comprise combining the reaction product thioacetals with a surfactant that acts, inter alia, to improve the solubility and performance of the thioacetal. Any surfactant compatible with the thioacetal may be used in the present invention. Such surfactants include, but are not limited to, ethoxylated nonyl phenol phosphate esters, non-ionic surfactants, cationic surfactants, alkyl phosphonate surfactants, linear alcohols, nonylphenol compounds, alkyoxylated fatty acids, alkylphenol alkoxylates, ethoxylated amides, ethoxylated alkyl amines, and mixtures thereof. Examples of mixtures of one or more cationic and nonionic surfactants are described in U.S. Pat. No. 6,311,773 issued to Todd, et al., the relevant disclosure of which is incorporated herein by reference. The surfactant or surfactants used may be included in corrosion inhibiting mixture in an amount in the range of from 0% to about 50% by weight of total corrosion inhibiting mixture.

Other embodiments of the present invention comprise combining the reaction product thioacetals with a solvent. A solvent may be particularly useful in cases in which the reaction product thioacetal is a solid at handling conditions. Any solvent that is compatible with the thioacetal and other components of the corrosion inhibiting mixture is suitable for use in the present invention. Suitable solvents include, but are not limited to, alcohols, glycols, dimethyl formamide and N-methyl pyrrolidone, water, and combinations thereof.

The solvent used may be included in corrosion inhibiting mixture in an amount in the range of from 0% to about 60% by weight of total corrosion inhibiting mixture.

To facilitate a better understanding of the present invention, the following examples of some of the preferred embodiments are given. In no way should such examples be read to limit the scope of the invention.

EXAMPLES

Example 1

One method of forming thioacetals corrosion inhibitors of the present invention involves combining a cinnamaldehyde compound with a thiol compound in the presence of an acid. Sample 1 was formed by placing cinnamaldehyde in glacial acetic acid and adding 2.2 equivalents of thioethanol, 0.05 equivalents of ρ-toluenesulfonic acid was also added to the reactive mixture to speed up the reaction.

The thioacetals corrosion inhibitors were tested on metal coupons free of surface contaminants and scale. To ensure that the coupons were properly prepared, they were soaked in acetone to remove any material remaining on the metal from manufacturing and then visually inspected for burrs or other loosely attached metal. Next, the coupons were bead blasted using coarse glass beads to remove contaminants including oxidation products and material lodged in areas where the coupon surfaces may be irregular. The coupons were then used immediately.

To test the activity of the corrosion inhibitors of the present invention, a weighed coupon was suspended from a Teflon® holder inside a cell constructed of glass. The cell was then placed in an autoclave, 100 mL of 15% HCl was poured into the cell, and then enough kerosene was added such that the coupon was sufficiently submerged. Finally, the contents of the test cells were infused either with traditional corrosion inhibitors, no inhibitor, or an above-described thioacetal inhibitors of the present invention. In each case in which inhibitor was added, 0.00378 mol was used. The autoclave was then pressurized to 1000 psig using nitrogen, heated to 225° F. for a total contact time of 3 hours. The results were as follows:

| Inhibitor Added | Corrosion Loss in lb/ft$^2$ |
| --- | --- |
| none | 0.436 |
| t-cinnamaldehyde | 0.166 |
| thioglycolic acid | 0.842 |
| Sample 1 | 0.015 |
| Sample 2 | 0.021 |
| Sample 3 | 0.036 |
| Sample 4 | 0.026 |
| Sample 5 | 0.077 |

Thus, the corrosion inhibitors of the present invention provide improved corrosion inhibition as opposed to the prior art. Samples 1 through 5 are corrosion inhibitors of the present invention and are further described below:

Sample 1: Common name—dithioethanol acetal of cinnamaldehyde Structure—

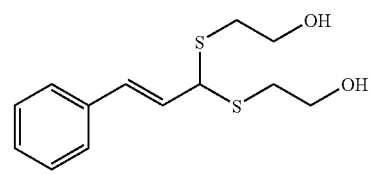

Sample 2: Common name—1,2-dithiolane of cinnamaldehyde Structure—

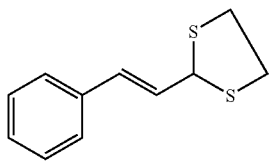

Sample 3: Common name—1,2-dithioacetic acid acetal of cinnamaldehyde Structure—

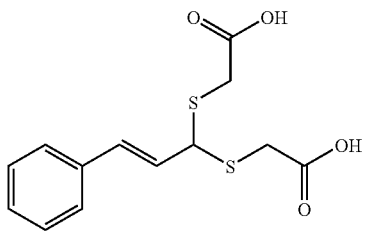

Sample 4: Common name—Dithioethanol acetal of crotonaldehyde Structure—

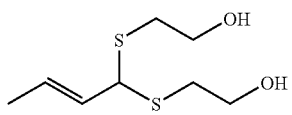

Sample 5: Common name—1,2-oxathiolane of crotonaldehyde Structure—

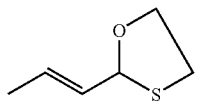

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

We claim:

1. A method of acidizing a near well bore region of a subterranean formation comprising:
   (a) isolating a zone of interest along a well bore; and,
   (b) placing an acidizing solution in the zone of interest, wherein the acidizing solution comprises an acid and a corrosion inhibiting compound comprising the reaction product of a thiol compound and an aldehyde compound, wherein the thiol compound has the general formula RSH wherein R is not H.

2. The method of claim 1 wherein the reaction product of a thiol compound and an aldehyde compound comprises a thioacetal.

3. The method of claim 2 wherein the thioacetal is selected from the group consisting of: a monothioacetal, a dithioacetal, and a combination thereof.

4. The method of claim 1 wherein the aldehyde compound is selected from the group consisting of: a cinnamaldehyde, a cinnamaldehyde derivative, a crotonaldehyde, a crotonaldehyde derivative, a benzene acetaldehyde, a benzene acetaldehyde derivative, and a combination thereof.

5. The method of claim 1 wherein the thiol compound is selected from the group consisting of: thiosorbitol, methanethiol, thioethanol, 1-thio-2-butanol, 1,2-ethanedithiol, 1,3-propanedithiol, 2-aminoethanethiol, 2-mercaptobenzothiazole, 2-mercaptothiazoline, glycol dimercaptoacetate, mercaptosuccinic acid, thioglycerol, thiolactic acid, cysteine, 6-aino-3-mercaptothiazole, 6-ethoxy-2-mercaptobenzothiazole, glycerol monothioglycolate, monoethanolamine thioglycolate, methyl thioglycolate, isooctyl thioglycolate, ethyl thioglycolate, 2-ethyl hexyl thioglycolate, thioglycolic acid, and a combination thereof.

6. The method of claim 1 wherein the corrosion inhibitor further comprises a traditional corrosion inhibitor.

7. The method of claim 6 wherein the traditional corrosion inhibitor is selected from the group consisting of: cinnamaldehyde, acetylenic alcohols, fluorinated surfactants, quatenary derivatives of heterocyclic nitrogen bases, quaternary derivatives of halomethylated aromatic compounds, formamides, quaternary ammonium compounds, and combinations thereof.

8. The method of claim 6 wherein the traditional corrosion inhibitor is selected from the group consisting of: N-alkyl, N-cycloalkyl, an N-alkylarylpyridinium halide, N-alkyl, N-cycloalkyl, a N-alkylarylquinolinium halide, and a combination thereof.

9. The method of claim 6 wherein the traditional corrosion inhibitor is present in an amount ranging from about 0.5% to about 80% by weight of the total corrosion inhibitor.

10. The method of claim 6 wherein the traditional corrosion inhibitor is present in an amount ranging from about 1% to about 45% by weight of the total corrosion inhibitor.

11. The method of claim 6 wherein the corrosion inhibitor further comprises a corrosion inhibitor activator.

12. The method of claim 11 wherein the corrosion inhibitor activator is selected from the group consisting of: cuprous iodide; cuprous chloride; an antimony oxide, an antimony halide, an antimony tartrate, an antimony citrate, an alkali metal salt of antimony tartrate, an alkali metal salt of antimony citrate, an alkali metal salt of pyroantimonate, an antimony adduct of ethylene glycol; a bismuth oxide, a bismuth halide, a bismuth tartrate, a bismuth citrate, an alkali metal salt of bismuth tartrate, an alkali metal salt of bismuth citrate, iodine, an iodide compounds, formic acid, and combinations thereof.

13. The method of claim 11 wherein the corrosion inhibitor activator is present in an amount ranging from about 0.1% to about 100% by weight of the total corrosion inhibitor.

14. The method of claim 1 wherein the corrosion inhibitor further comprises a surfactant.

15. The method of claim 14 wherein the surfactant is selected from the group consisting of: an ethoxylated nonyl phenol phosphate ester, a non-ionic surfactant, a cationic surfactant, a non-ionic surfactant, an alkyl phosphonate surfactant, a linear alcohol, a monophenol compound, an alkyoxylated fatty acid, an alkylphenol alkoxylate, an ethoxylated amide, an ethoxylated alkyl amine, and a combination thereof.

16. The method of claim 14 wherein the surfactant is present in an amount ranging from about 0.1% to about 50% of the weight of the total corrosion inhibitor.

17. The method of claim 1 wherein the corrosion inhibitor further comprises a solvent.

18. The method of claim 17 wherein the solvent is selected from the group consisting of: an alcohol, a glycol, dimethyl formamide, N-methyl pyrrolidone, water and a combination thereof.

19. The method of claim 17 wherein the solvent is present in an amount ranging from about 0.1% to about 60% by weight of the total corrosion inhibitor.

20. The method of claim 1 wherein the acid is selected from the group consisting of: hydrochloric acid, hydrofluoric acid, acetic acid, formic acid, citric acid, ethylene diamine tetra acetic acid ("EDTA"), and a combination thereof.

* * * * *